Sept. 9, 1969 J. A. I. ÖHLUND 3,466,609

MODULATED CARRIER RADIO CONTROL APPARATUS

Filed May 9, 1966 4 Sheets-Sheet 1

Inventor
John Alex Ingvar Öhlund
By [signature]
Attorney

MODULATED CARRIER RADIO CONTROL APPARATUS

Filed May 9, 1966 4 Sheets-Sheet 2

Inventor
John Alex Ingvar Öhlund
By [signature]
Attorney

MODULATED CARRIER RADIO CONTROL APPARATUS

Filed May 9, 1966 4 Sheets-Sheet 3

Inventor
John Alex Ingvar Öhlund
By [signature]
Attorney

Inventor
John Alex Ingvar Öhlund
By Ira Milton Jones
Attorney

United States Patent Office 3,466,609
Patented Sept. 9, 1969

3,466,609
MODULATED CARRIER RADIO CONTROL APPARATUS

John Alex Ingvar Öhlund, Huskvarna, Sweden, assignor to Saab Aktiebolag, Linkoping, Sweden, a corporation of Sweden Filed May 9, 1966, Ser. No. 548,707
Claims priority, application Sweden, May 12, 1965, 6,162/65
Int. Cl. H04q *1/00, 5/00, 7/00*
U.S. Cl. 340—171 1 Claim

ABSTRACT OF THE DISCLOSURE

For remote control of a number of servos, a plurality of different tone generators are energized in selected pairs, modulating a transmitted carrier simultaneously with two audio frequencies. Receiver output is fed to filters, one for each audio frequency, each controlling a relay having two normally open switch elements and a normally closed one. Each servo is energized through the normally open switch elements of each of two relays and the normally closed one of a third.

This invention relates to remote control apparatus and more particularly to a radio control device which utilizes a single modulated carrier wave for controlling a number of servos or servo functions.

In most of the single carrier radio control systems heretofore used, the carrier wave of the transmitter has been modulated with an audio frequency for each servo function to be controlled. Thus if a prior control system were required to provide for the control of twelve on-off type servos, twelve different audio frequency generators had to be provided for modulating the carrier wave, one for each servo; and the receiving equipment had to be provided with a corresponding number of audio filters. Each audio frequency generator and its corresponding filter thus cooperated to provide a single order channel.

When employed for the control of equipment requiring a large number of order channels, the large number of audio frequency generators and filters that were required in a system using one audio frequency per order channel made such prior apparatus both bulky and expensive. A further very important disadvantage of such prior apparatus was that it tended to respond to signals from other radio equipments which happened to be modulated at the audio frequency of one of its order channels, with the result that unexpected and undesired servo operations sometimes occurred.

The primary object of the present invention is to provide radio control apparatus having a multiplicity of order channels and which employs a single carrier wave modulated by means of a substantially smaller number of audio frequencies than the number of order channels provided, so that the control apparatus is relatively compact and inexpensive, but which apparatus is nevertheless relatively insensitive to extraneous signals such as may be produced, for example, by other transmitter equipment or by atmospheric or man-made noise signal sources.

Another object of this invention is to provide apparatus for the remote control of simulators and similar equipment in a target area for military training, which control apparatus is inexpensive and dependable but is nevertheless sufficiently compact so that its transmitter and control console can comprise a single readily portable unit.

With the above and other objects in view which will appear as the description proceeds, this invention resides in the novel construction, combination and arrangement of parts substantially as hereinafter described and more particularly defined by the appended claims, it being understood that such changes may be made in the precise embodiment of the herein disclosed invention as come within the scope of the claims.

The accompanying drawings illustrate one complete example of a physical embodiment of the invention constructed according to the best mode so far devised for the practical application of the principles thereof, and in which.

Figure 1:
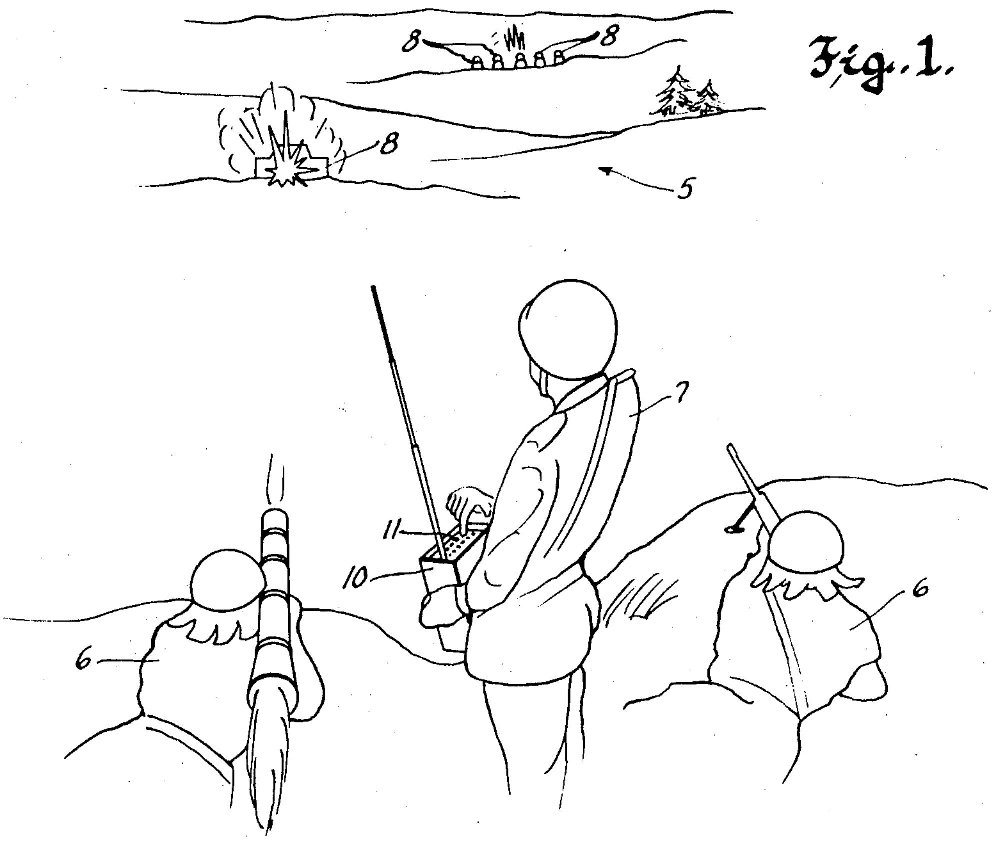
FIGURE 1 is a perspective view of a military training field having simulators of enemy action that are remotely controlled by apparatus of the present invention, and the figure thus illustrates a typical application of such control apparatus.

In the accompanying drawings and in the following explanation the control apparatus of this invention is illustrated and described in connection with certain military training equipment to which it is well adapted by reason of its compactness, dependability and versatility. It will be understood, however, that this is merely illustrative of one of the many applications for which the radio control apparatus is adapted. It is also suitable for the remote control of target drone aircraft, land and marine vehicles, for industrial processes which are potentially dangerous to personnel, and for other applications which will readily suggest themselves.

Referring now to the accompanying drawings, the numeral 5 designates generally a target area toward which troops 6 undergoing combat training can fire their weapons under the supervision of an instructor 7. In the target area there are placed targets 8 and weapon fire simulators 9 which cooperate in simulating the activity of an enemy against which the troops are directing their fire. By means of the remote control apparatus of this invention, the instructor can cause selected targets to appear and disappear, and can cause selected weapon fire simulators to produce the noise and appearance of weapons being discharged by a fictitious enemy operating against the troops undergoing training.

Figure 4:
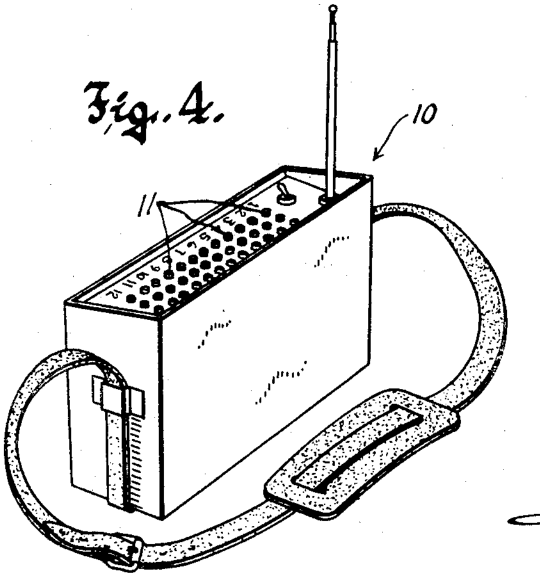
FIGURE 4 is a perspective view of a combined console and transmitter comprising a command unit for a radio control apparatus embodying the principles of this invention, which command unit can be employed for controlling the simulators depicted in FIGURES 2 and 3.

For effecting the desired actuation of the targets 8 and weapon fire simulators 9 the instructor has a portable command unit 10, best seen in FIGURE 4 and described in detail hereinafter, which comprises in general a radio transmitter, control console, modulating means and battery pack or similar power supply, all preferably housed in a single compact enclosure. The instructor operates the apparatus by means of pushbuttons 11 on the control console of the command unit, which cause modulated carrier wave signals to be emitted by the transmitter.

Figure 3:
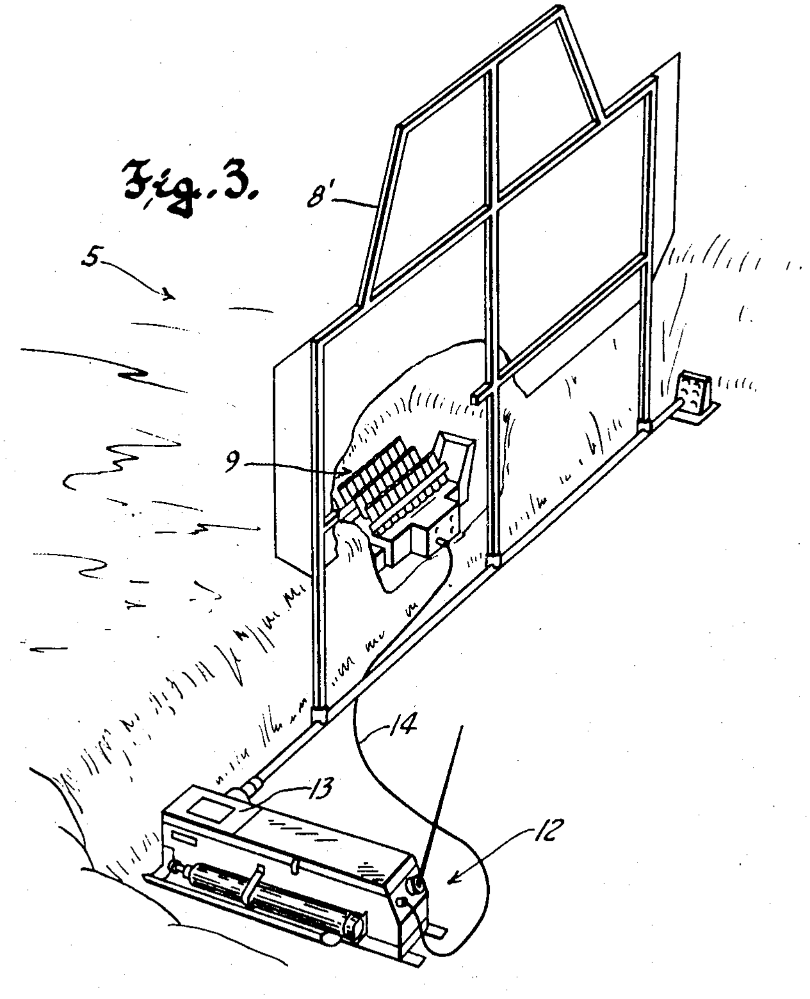
FIGURE 3 is a perspective view of another type of target device to be controlled and which simulates an enemy tank.

Such signals are detected by receiver units 12 located in the target area, each adjacent to and connected with one or more targets 8 and weapon fire simulators 9. FIGURE 3 illustrates a typical installation controlled by a receiver unit 12, comprising a target 8' in the shape of a tank, and a weapon fire simulator 9 adjacent to the target.

The target 8′, which is of a known type, is mounted to swing about a horizontal axis between an upright visible position, in which it is shown in FIGURE 3, and a horizontal concealed position. Such up and down swinging motion is imparted to the target by means of a reversible electric motor mechanism 13 which is preferably housed in the same enclosure with the receiver unit. The weapon fire simulator 9, which is likewise of a known type, is electrically connected with the receiver unit by means of a cable 14.

Figure 2:
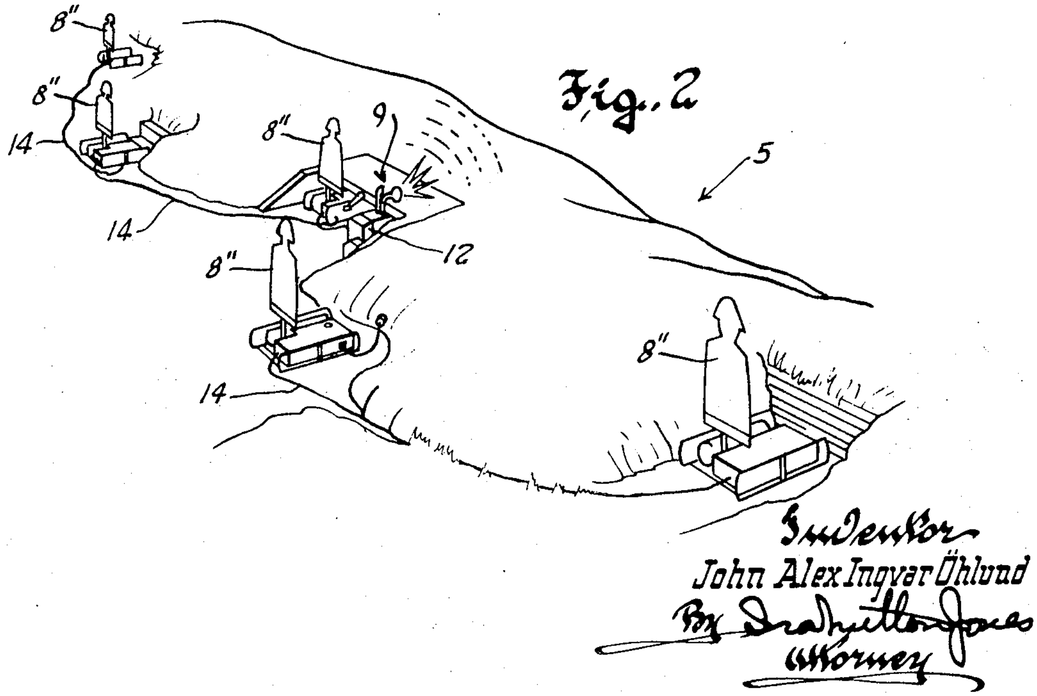
FIGURE 2 is a perspective view of a target group simulating enemy troops on the military training field depicted in FIGURE 1.

As illustrated in FIGURE 2, several targets 8″ can be connected with a single receiver unit 12 to be raised or lowered simultaneously, and in like manner two or more weapons fire simulators can be connected with a single receiver unit for simultaneous operation.

In the illustrated embodiment of the invention, the console of the command unit 10 has 36 of the pushbuttons 11, to provide 36 order channels; that is, the illustrated equipment is capable of effecting any selected one of the 36 different operations. As shown, the pushbuttons on the console are arranged in 12 columns and in three rows. Each column of pushbuttons can correspond to a different simulator position, and each row can correspond to a different control order. In this case the top pushbutton in each column gives the order to RAISE, i.e., causes the target at the location denoted by its column to rise to its visible position; the middle of each column gives the order to FIRE, i.e., causes operation of the weapon fire simulator at the location corresponding to its column; and the bottom pushbutton gives the order to LOWER, i.e., causes the target at the location corresponding to its column to move down to its invisible position. The pushbuttons are biased upwardly and are intended to be depressed individually and only momentarily.

Figure 5:
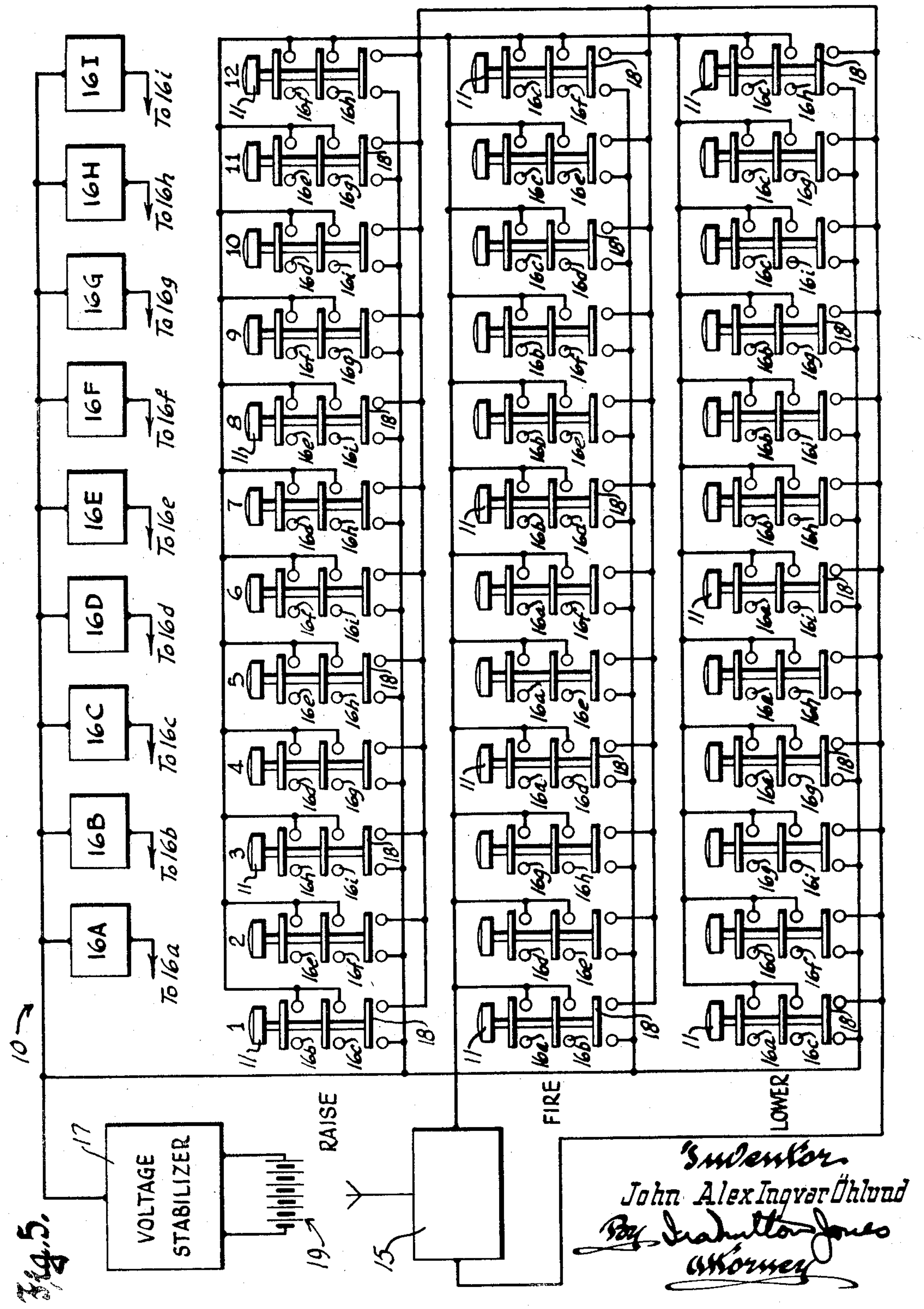
FIGURE 5 is a diagram of the transmitter of the control apparatus of this invention and its audio frequency modulating means.

Referring now to FIGURE 5, the transmitter 15 is modulated by means of a number of audio frequency generators 16A–16I, which can be either electronic oscillators of known type or known electro-mechanical tone generators, each comprising a tuning fork arranged to vibrate in a magnetic field associated with a coil so that the vibration of the tuning fork varies the flux density of the magnetic field cut by the coil to induce current in the coil at a frequency corresponding to that of the tuning fork. The several audio frequency generators are all tuned to different audio frequencies. As explained hereinafter, the number of audio frequency generators to be employed in a given apparatus depends upon the number of order channels to be provided, there being nine audio-frequency generators in the present case.

The audio frequency generators 16A–16I are energized through a voltage stabilizer 17 connected with a suitable voltage source, such as a battery pack 19, under the control of the pushbuttons 11. It is a feature of the apparatus of this invention that each of the pushbuttons 11, when depressed, keeps the transmitter and connects two of the audio frequency generators with it to modulate its emitted carrier wave, so that with every signal emitted by the transmitter its carrier is simultaneously modulated by two audio frequencies.

To this end each of the pushbuttons 11 is arranged to actuate three normally open switch elements. One of these switch elements of each pushbutton, designated by 18, is a keying switch connected in parallel with the keying switch elements 18 of all of the other pushbuttons, and which serves to connect the transmitter 15 with the voltage stabilizer 17 to energize the transmitter for emission of a carrier wave. The other two normally open switch elements actuated by each pushbutton connect a pair of audio frequency generators with the transmitter for modulation of its emitted carrier wave. It will be observed that each pushbutton is operatively associated with a different pair of audio frequency generators, and that each audio frequency generator is connected with a switch element of each of nine different pushbuttons. With specific reference to FIGURE 5, it will be observed, for example, that when the pushbutton at the left end of the "RAISE" (top) row is depressed, the carrier wave is modulated with audio frequencies generated by the audio frequency generators 16B and 16C; when the extreme left pushbutton of the "FIRE" (middle) row is depressed, the transmitter is connected for modulation with audio frequency generators 16A and 16B; and when the extreme left pushbutton in the lower (bottom) row is depressed, the carrier wave is modulated by audio frequency generators 16A and 16C. By thus utilizing the audio frequency generators in pairs, the nine audio frequency generators of the present example can be employed to produce a unique dual audio frequency modulation for each of the 36 pushbuttons.

Preferably each control impulse signal is of relatively short duration—on the order of a few tenths of a second—to minimize the possibility of interference with other radio equipment. Any suitable means can be employed for thus limiting the duration of the control signals.

Figure 6:
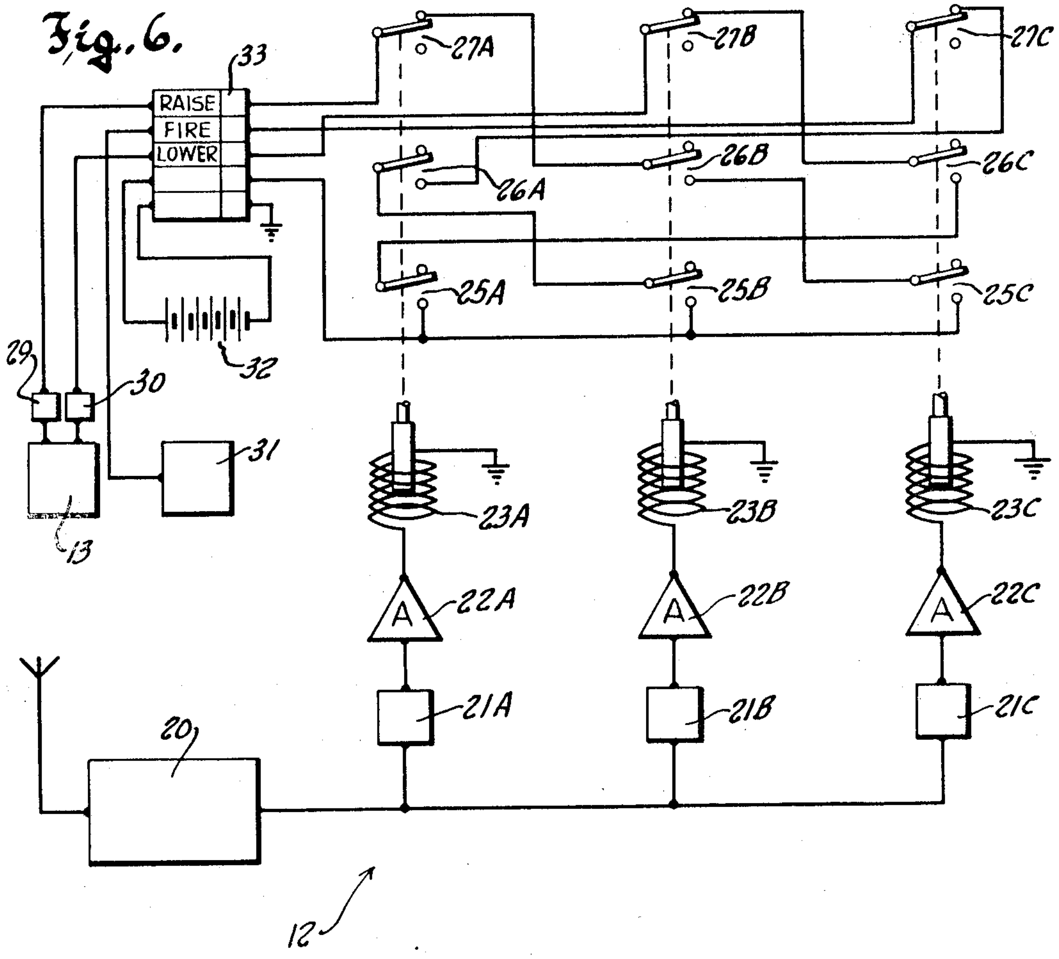
FIGURE 6 is a circuit diagram of the receiver unit of the control apparatus.

The receiver unit 12 at each simulator position, which cooperates with the transmitter means just described, is shown diagrammatically in FIGURE 6.

The illustrated receiver unit 12 can be regarded as controlling three servos, namely, a servo 29 for raising a target, a servo 30 for lowering the target, and a servo 31 for actuating a weapons fire simulator. In practice the respective functions of raising and lowering the target will probably be performed by a single reversible mechanism 13, but in view of the reconnections required for reversing that mechanism, and the dual function which it performs, such mechanism is herein treated, for puposes of explanation, as comprising a "raise" servo and a "lower" servo, and the term "servo" is used herein in the special sense of means for performing one specific operation, even when two or more "servos" are comprised of one reversible or otherwise multifunctional mechanism.

Each receiver unit 12 comprises a suitable detector 20, the output of which is fed to three audio frequency filters 21A, 21B, 21C, each tuned to the frequency of one of the audio frequency generators 16A–16I of the transmitter. Each audio frequency filter can comprise a sharply peaked inductance-capacitance network of known type, or, as is preferable, can be a resonant reed type of relay. There is an amplifier 22A, 22B, 22C for each audio frequency filter through which the output of the filter is imposed upon a relay 23A, 23B, 23C. Each of said relays comprises a pair of normally open switch elements and a normally closed switch element. The normally open switch elements of relay 23A are designated by 25A and 26A and its normally closed switch element by 27A; the normally closed switch elements of relay 23B are designated by 25B and 26B and its normally closed switch element by 27B; and corresponding designations are used for the switch elements of relay 23C.

The servos 29, 30, 31 and a suitable voltage source such as a battery pack 32 are connected with the switch elements of the relays 23A, 23B, 23C by means of a suitable multiple plug connector 33.

The several switch elements of the relays are so interconnected as to provide for connection of each of the servos with the current source through one of the normally open switch elements of each of two relays and through the normally closed switch element of the third relay. Thus in FIGURE 6 the energizing circuit for the "raise" servo 29 can be traced from the positive terminal of the voltage source through normally open switch element 25C of relay 23C, thence through normally open switch element 26B of relay 23B, and thence through normally closed switch element 27A of relay 23A. It will be apparent, therefore, that the "raise" servo 29 will be energized only in response to a received signal that is modulated with the audio frequencies for which filters 21B and 21C are tuned, whereby relays 23B and 23C are energized while relay 23A remains unenergized. Similarly the "lower" servo 30 responds to the frequencies for which filters 21A and 21C are tuned, and the "fire" servo 31 responds to audio frequencies to which filters 21A and 21B are tuned.

An interference or noise signal modulated with the audio frequency of only one of the three filters 21A, 21B or 21C will not effect operation of a servo because simultaneous energization of two of the relays 23A, 23B, 23C is necessary for that purpose owing to the series connection with each servo of normally open switch elements of each of two relays. Similarly a noise or interference signal which energizes all three relays will cause no response of the servos because all three of the normally closed switch elements 27A, 27B and 27C will then be open.

It will be apparent that additional filters and relays can be connected with the detector 20 for the control of additional servos, the arrangement illustrated in FIGURE 6 and described above being a very simple and basic one which nevertheless has great practical value in the case of the military training equipment herein shown and described.

It will also be apparent that the number of audio frequencies that can be utilized is subject to substantially large variation. In general the number of audio frequencies to be employed depends upon the number of servos to be controlled, the relation being given by:

$$S=F(F-1)/2$$

where S is the number of servos that can be controlled and F is the number of different audio frequencies employed.

From the foregoing description taken together with the accompanying drawings it will be apparent that this invention provides a compact, reliable and inexpensive radio control apparatus whereby a single modulated carrier wave can be employed to control a large number of servos and which is relatively insensitive to disturbances from other radio equipment and other radio frequency noise sources.

What is claimed as my invention is:

1. Remote control apparatus by which a single carrier wave can be employed for energizing any selected one of a plurality of servos, comprising:

(A) transmitter means for generating a carrier wave capable of being modulated;

(B) a plurality of audio signal generators operatively associated with said transmitter means, for modulating the carrier wave generated thereby, each of said audio signal generators being capable of producing an output signal of a frequency different from that of the others;

(C) means for modulating the carrier wave produced by said transmitter means with the simultaneous outputs of any selected pair of said audio signal generators, so that each modulation of the carrier wave by a different pair of audio frequencies corresponds to a different servo to be controlled;

(D) receiver means having a plurality of audio frequency filter means responsive to different frequencies, one for each of said audio signal generators and each responsive only to the frequency of its audio signal generator;

(E) a plurality of relay means, one operatively associated with each of said filter means to respond to output signals thereof and each of said relay means having a pair of normally closed switch elements and a normally open switch element; and (F) means for connecting each servo with a source of energization through a normally open switch element of each of two said relay means and the normally closed switch element of another relay means so that each servo is energized only in response to a carrier wave modulated by two audio frequencies.

References Cited

UNITED STATES PATENTS

| | | | |
|---|---|---|---|
| 2,513,342 | 7/1950 | Marshall. | |
| 2,617,872 | 11/1952 | Herrick | 340—171 XR |
| 2,900,621 | 8/1959 | Stenerson et al. | 340—171 XR |
| 3,351,945 | 11/1967 | Borsattino et al. | 343—225 |

DONALD J. YUSKO, Primary Examiner

U.S. Cl. X.R.

343—225

UNITED STATES PATENT OFFICE

CERTIFICATE OF CORRECTION

Patent No. 3,466,609 September 9, 1969

John Alex Ingvar Öhlund

It is certified that error appears in the above identified patent and that said Letters Patent are hereby corrected as shown below:

Column 3, line 55, "keeps" should read -- keys --. Column 6, line 21 should read -- -sociated with each of two of said filter means to respond --.

Signed and sealed this 24th day of February 1970.

(SEAL)
Attest:

Edward M. Fletcher, Jr.
Attesting Officer

WILLIAM E. SCHUYLER, JR.
Commissioner of Patents